(12) United States Patent
Kunz et al.

(10) Patent No.: US 7,319,669 B1
(45) Date of Patent: Jan. 15, 2008

(54) METHOD AND SYSTEM FOR CONTROLLING PACKET FLOW IN NETWORKS

(75) Inventors: James A. Kunz, Plymouth, MN (US); Leonard W. Haseman, Eagan, MN (US); Mark A. Owen, Apple Valley, MN (US); William J. Gustafson, Apple Valley, MN (US)

(73) Assignee: QLogic, Corporation, Aliso Viejo, CA (US)

( * ) Notice: Subject to any disclaimer, the term of this patent is extended or adjusted under 35 U.S.C. 154(b) by 1007 days.

(21) Appl. No.: 10/302,149

(22) Filed: Nov. 22, 2002

(51) Int. Cl.
*H04L 12/28* (2006.01)
*H04L 12/54* (2006.01)
*H04L 12/56* (2006.01)

(52) U.S. Cl. .............. 370/235; 370/395.42; 370/409; 370/412; 370/428

(58) Field of Classification Search ............. 370/235, 370/395.42, 409, 412, 428
See application file for complete search history.

(56) References Cited

U.S. PATENT DOCUMENTS

| | | |
|---|---|---|
| 4,162,375 A | 7/1979 | Schilichte .................. 179/15 |
| 4,200,929 A | 4/1980 | Davidjuk et al. |
| 4,268,906 A | 5/1981 | Bourke et al. |
| 4,333,143 A | 6/1982 | Calder |
| 4,382,159 A | 5/1983 | Bowditch |
| 4,425,640 A | 1/1984 | Philip et al. .................. 370/58 |
| 4,449,182 A | 5/1984 | Rubinson et al. |
| 4,546,468 A | 10/1985 | Christmas et al. ............ 370/54 |
| 4,549,263 A | 10/1985 | Calder |
| 4,569,043 A | 2/1986 | Simmons et al. ............. 370/63 |
| 4,725,835 A | 2/1988 | Schreiner et al. ...... 340/825.83 |
| 4,777,595 A | 10/1988 | Strecker et al. |
| 4,783,730 A | 11/1988 | Fischer et al. |

(Continued)

FOREIGN PATENT DOCUMENTS

EP 0649098 9/1994

(Continued)

OTHER PUBLICATIONS

Clark, Tom, "Zoning for Fibre Channel Fabrics", Vixel Corporation Paper—XP002185194., (Aug. 1999), pp. 1-6.

(Continued)

*Primary Examiner*—Alpus H. Hsu
(74) *Attorney, Agent, or Firm*—Klein, O'Neill & Singh, LLP

(57) ABSTRACT

A system and method for transmitting and bundling network packets is provided. The incoming network packet size is determined and if the remote buffer space is sufficient to hold the network packet it is transmitted to the destination port. If the remote buffer space is not enough to hold the network packet it is discarded. The system includes an arbitration module that receives remote buffer space information and transmits the network packet if the remote buffer space has enough space to hold the packet. The arbitration module also determines if a second network packet is from a same source port having a same source virtual lane, and has the same destination virtual lane (bundling conditions). If the second network packet meets the bundling conditions, then it is transmitted after the first network packet, even if other packets were received before the second network packet.

15 Claims, 4 Drawing Sheets

U.S. PATENT DOCUMENTS

| | | | |
|---|---|---|---|
| 4,783,739 A | 11/1988 | Calder | |
| 4,803,622 A | 2/1989 | Bain, Jr. et al. | |
| 4,821,034 A | 4/1989 | Anderson et al. | 340/825 |
| 4,980,857 A | 12/1990 | Walter et al. | |
| 5,051,742 A | 9/1991 | Hullett et al. | |
| 5,115,430 A | 5/1992 | Hahne et al. | |
| 5,129,064 A | 7/1992 | Fogg, Jr. et al. | |
| 5,144,622 A | 9/1992 | Takiyasu et al. | 370/85.13 |
| 5,212,795 A | 5/1993 | Hendry | |
| 5,249,279 A | 9/1993 | Schmenk et al. | |
| 5,276,807 A | 1/1994 | Kodama et al. | |
| 5,321,816 A | 6/1994 | Rogan et al. | |
| 5,347,638 A | 9/1994 | Desai et al. | |
| 5,367,520 A | 11/1994 | Cordell | 370/60 |
| 5,371,861 A | 12/1994 | Keener et al. | |
| 5,448,702 A | 9/1995 | Garcia, Jr. et al. | |
| 5,568,614 A | 10/1996 | Mendelson et al. | |
| 5,590,125 A | 12/1996 | Acampora et al. | |
| 5,598,541 A | 1/1997 | Malladi | 395/286 |
| 5,610,745 A | 3/1997 | Bennett | 359/139 |
| 5,623,492 A * | 4/1997 | Teraslinna | 370/397 |
| 5,647,057 A | 7/1997 | Roden et al. | |
| 5,666,483 A | 9/1997 | McClary | |
| 5,671,365 A | 9/1997 | Binford et al. | |
| 5,687,172 A | 11/1997 | Cloonan et al. | 370/395 |
| 5,701,416 A * | 12/1997 | Thorson et al. | 712/11 |
| 5,706,279 A * | 1/1998 | Teraslinna | 370/232 |
| 5,740,467 A | 4/1998 | Chmielecki et al. | |
| 5,748,612 A | 5/1998 | Stoevhase et al. | 370/230 |
| 5,758,187 A | 5/1998 | Young | |
| 5,761,427 A | 6/1998 | Shah et al. | |
| 5,812,525 A * | 9/1998 | Teraslinna | 370/229 |
| 5,818,842 A | 10/1998 | Burwell et al. | 370/397 |
| 5,828,475 A | 10/1998 | Bennett et al. | |
| 5,828,903 A | 10/1998 | Sethuram et al. | |
| 5,835,752 A | 11/1998 | Chiang et al. | |
| 5,875,343 A | 2/1999 | Binford et al. | |
| 5,881,296 A | 3/1999 | Williams et al. | |
| 5,892,969 A | 4/1999 | Young | |
| 5,894,560 A | 4/1999 | Carmichael et al. | |
| 5,905,905 A | 5/1999 | Dailey et al. | |
| 5,917,723 A | 6/1999 | Binford | |
| 5,937,169 A | 8/1999 | Connery et al. | |
| 5,968,143 A | 10/1999 | Chisholm et al. | |
| 5,978,359 A * | 11/1999 | Caldara et al. | 370/236 |
| 5,983,292 A | 11/1999 | Nordstrom et al. | |
| 5,987,028 A | 11/1999 | Yang et al. | 370/380 |
| 5,999,528 A | 12/1999 | Chow et al. | 370/365 |
| 6,006,340 A | 12/1999 | O'Connell | |
| 6,014,383 A | 1/2000 | McCarty | 370/453 |
| 6,021,128 A | 2/2000 | Hosoya et al. | 370/380 |
| 6,026,092 A * | 2/2000 | Abu-Amara et al. | 370/411 |
| 6,031,842 A | 2/2000 | Trevitt et al. | |
| 6,047,323 A | 4/2000 | Krause | 709/227 |
| 6,049,802 A | 4/2000 | Waggener, Jr. et al. | |
| 6,055,603 A | 4/2000 | Ofer et al. | |
| 6,055,618 A * | 4/2000 | Thorson | 712/11 |
| 6,061,360 A | 5/2000 | Miller et al. | |
| 6,078,970 A | 6/2000 | Nordstrom | |
| 6,081,512 A | 6/2000 | Muller et al. | 370/256 |
| 6,085,277 A | 7/2000 | Nordstrom et al. | |
| 6,105,122 A | 8/2000 | Muller et al. | |
| 6,108,738 A | 8/2000 | Chambers et al. | |
| 6,108,778 A | 8/2000 | LaBerge | |
| 6,115,761 A | 9/2000 | Daniel et al. | |
| 6,118,776 A | 9/2000 | Berman | |
| 6,128,292 A | 10/2000 | Kim et al. | 370/356 |
| 6,134,617 A | 10/2000 | Weber | |
| 6,138,176 A | 10/2000 | McDonald et al. | |
| 6,144,668 A | 11/2000 | Bass et al. | |
| 6,160,813 A | 12/2000 | Banks et al. | 370/422 |
| 6,185,620 B1 | 2/2001 | Weber et al. | |
| 6,201,787 B1 | 3/2001 | Baldwin et al. | |
| 6,229,822 B1 | 5/2001 | Chow et al. | |
| 6,233,244 B1 | 5/2001 | Runaldue et al. | |
| 6,240,096 B1 | 5/2001 | Book | |
| 6,246,683 B1 | 6/2001 | Connery et al. | |
| 6,247,060 B1 | 6/2001 | Boucher et al. | |
| 6,253,267 B1 | 6/2001 | Kim et al. | |
| 6,269,413 B1 | 7/2001 | Sherlock | |
| 6,289,002 B1 | 9/2001 | Henson et al. | |
| 6,308,220 B1 | 10/2001 | Mathur | 709/238 |
| 6,324,181 B1 | 11/2001 | Wong et al. | 370/403 |
| 6,330,236 B1 | 12/2001 | Ofek et al. | 370/369 |
| 6,334,153 B2 | 12/2001 | Boucher et al. | |
| 6,343,324 B1 | 1/2002 | Hubis et al. | |
| 6,353,612 B1 | 3/2002 | Zhu et al. | |
| 6,370,605 B1 | 4/2002 | Chong | |
| 6,389,479 B1 | 5/2002 | Boucher et al. | |
| 6,393,487 B2 | 5/2002 | Boucher et al. | |
| 6,401,128 B1 | 6/2002 | Stai et al. | |
| 6,408,349 B1 | 6/2002 | Castellano | |
| 6,411,599 B1 | 6/2002 | Blanc et al. | 370/219 |
| 6,411,627 B1 | 6/2002 | Hullett et al. | |
| 6,418,477 B1 | 7/2002 | Verma | |
| 6,421,711 B1 | 7/2002 | Blumenau et al. | |
| 6,424,658 B1 | 7/2002 | Mathur | 370/429 |
| 6,427,171 B1 | 7/2002 | Craft et al. | |
| 6,427,173 B1 | 7/2002 | Boucher et al. | |
| 6,434,620 B1 | 8/2002 | Boucher et al. | |
| 6,434,630 B1 | 8/2002 | Micalizzi, Jr. et al. | |
| 6,449,274 B1 | 9/2002 | Holden et al. | 370/392 |
| 6,452,915 B1 | 9/2002 | Jorgensen | |
| 6,457,090 B1 | 9/2002 | Young | |
| 6,463,032 B1 | 10/2002 | Lau et al. | |
| 6,467,008 B1 | 10/2002 | Gentry et al. | |
| 6,470,026 B1 | 10/2002 | Pearson et al. | |
| 6,470,173 B1 | 10/2002 | Okada et al. | |
| 6,470,415 B1 | 10/2002 | Starr et al. | |
| 6,502,189 B1 | 12/2002 | Westby | |
| 6,504,846 B1 | 1/2003 | Yu et al. | |
| 6,532,212 B1 | 3/2003 | Soloway et al. | |
| 6,546,010 B1 | 4/2003 | Merchant et al. | |
| 6,564,271 B2 | 5/2003 | Micalizzi et al. | |
| 6,570,850 B1 | 5/2003 | Gutierrez et al. | |
| 6,591,302 B2 | 7/2003 | Boucher et al. | |
| 6,594,231 B1 | 7/2003 | Byham et al. | |
| 6,594,329 B1 | 7/2003 | Susnow | |
| 6,597,691 B1 | 7/2003 | Anderson et al. | 370/360 |
| 6,597,777 B1 | 7/2003 | Ho | |
| 6,614,796 B1 | 9/2003 | Black et al. | |
| 6,643,748 B1 | 11/2003 | Wieland | |
| 6,697,359 B1 | 2/2004 | George | 370/357 |
| 6,697,368 B2 | 2/2004 | Chang et al. | |
| 6,721,799 B1 | 4/2004 | Slivkoff | |
| 6,725,388 B1 | 4/2004 | Susnow | |
| 6,744,772 B1 * | 6/2004 | Eneboe et al. | 370/400 |
| 6,760,302 B1 | 7/2004 | Ellinas et al. | |
| 6,775,693 B1 | 8/2004 | Adams | |
| 6,785,241 B1 | 8/2004 | Lu et al. | |
| 6,807,181 B1 | 10/2004 | Weschler | |
| 6,810,440 B2 | 10/2004 | Micalizzi, Jr. et al. | |
| 6,810,442 B1 | 10/2004 | Lin | |
| 6,816,750 B1 | 11/2004 | Klaas | |
| 6,859,435 B1 | 2/2005 | Lee et al. | |
| 6,886,141 B1 | 4/2005 | Kunz et al. | |
| 6,941,357 B2 | 9/2005 | Nguyen et al. | |
| 6,941,482 B2 | 9/2005 | Strong | |
| 6,952,659 B2 | 10/2005 | King et al. | |
| 6,968,463 B2 | 11/2005 | Pherson et al. | |
| 7,000,025 B1 | 2/2006 | Wilson | |
| 7,002,926 B1 * | 2/2006 | Eneboe et al. | 370/255 |
| 7,010,607 B1 | 3/2006 | Bunton | |
| 7,039,070 B2 | 5/2006 | Kawakatsu | |

| | | |
|---|---|---|
| 7,039,870 B2 | 5/2006 | Takaoka et al. |
| 7,047,326 B1 | 5/2006 | Crosbie et al. |
| 7,050,392 B2 | 5/2006 | Valdevit |
| 7,055,068 B2 | 5/2006 | Riedl |
| 7,092,374 B1 | 8/2006 | Gubbi |
| 7,110,394 B1 | 9/2006 | Chamdani et al. |
| 7,124,169 B2 | 10/2006 | Shimozono et al. |
| 7,151,778 B2 | 12/2006 | Zhu et al. |
| 7,171,050 B2 | 1/2007 | Kim |
| 7,185,062 B2 | 2/2007 | Lolayekar et al. |
| 7,190,667 B2* | 3/2007 | Susnow et al. ............. 370/229 |
| 7,194,538 B1 | 3/2007 | Rabe et al. |
| 7,200,108 B2 | 4/2007 | Beer et al. |
| 7,215,680 B2 | 5/2007 | Mullendore et al. |
| 7,221,650 B1 | 5/2007 | Cooper et al. |
| 7,245,613 B1* | 7/2007 | Winkles et al. ............. 370/365 |
| 7,248,580 B2 | 7/2007 | George et al. |
| 7,269,131 B2 | 9/2007 | Cashman et al. |
| 7,292,593 B1* | 11/2007 | Winkles et al. ............. 370/412 |
| 2001/0011357 A1 | 8/2001 | Mori |
| 2001/0038628 A1 | 11/2001 | Ofek et al. ................. 370/392 |
| 2001/0047460 A1 | 11/2001 | Kobayashi et al. |
| 2002/0034178 A1 | 3/2002 | Schmidt et al. |
| 2002/0071387 A1* | 6/2002 | Horiguchi et al. .......... 370/229 |
| 2002/0103913 A1 | 8/2002 | Tawil et al. |
| 2002/0104039 A1 | 8/2002 | DeRolf et al. |
| 2002/0124124 A1 | 9/2002 | Matsumoto et al. |
| 2002/0147560 A1 | 10/2002 | Devins et al. |
| 2002/0147802 A1 | 10/2002 | Murotani et al. |
| 2002/0147843 A1 | 10/2002 | Rao |
| 2002/0156918 A1 | 10/2002 | Valdevit et al. |
| 2002/0172195 A1* | 11/2002 | Pekkala et al. ............. 370/360 |
| 2002/0191602 A1 | 12/2002 | Woodring et al. |
| 2002/0196773 A1 | 12/2002 | Berman |
| 2003/0002503 A1 | 1/2003 | Brewer et al. |
| 2003/0016683 A1 | 1/2003 | George et al. |
| 2003/0021239 A1 | 1/2003 | Mullendore et al. |
| 2003/0026267 A1 | 2/2003 | Oberman et al. |
| 2003/0026287 A1 | 2/2003 | Mullendore et al. |
| 2003/0035433 A1 | 2/2003 | Craddock et al. |
| 2003/0046396 A1 | 3/2003 | Richter et al. |
| 2003/0056000 A1 | 3/2003 | Mullendore et al. |
| 2003/0072316 A1 | 4/2003 | Niu et al. |
| 2003/0079019 A1 | 4/2003 | Lolayekar et al. |
| 2003/0084219 A1 | 5/2003 | Yao et al. |
| 2003/0086377 A1 | 5/2003 | Berman |
| 2003/0091062 A1 | 5/2003 | Lay et al. |
| 2003/0103451 A1 | 6/2003 | Lutgen et al. |
| 2003/0117961 A1 | 6/2003 | Chuah et al. |
| 2003/0120983 A1 | 6/2003 | Vieregge et al. |
| 2003/0126320 A1 | 7/2003 | Liu et al. |
| 2003/0137941 A1 | 7/2003 | Kaushik et al. |
| 2003/0174789 A1 | 9/2003 | Waschura et al. |
| 2003/0179709 A1 | 9/2003 | Huff |
| 2003/0179748 A1 | 9/2003 | George et al. ............. 370/389 |
| 2003/0189930 A1 | 10/2003 | Terrell et al. |
| 2003/0189935 A1 | 10/2003 | Warden et al. |
| 2003/0195983 A1 | 10/2003 | Krause |
| 2003/0229808 A1 | 12/2003 | Heintz et al. |
| 2003/0236953 A1 | 12/2003 | Grieff et al. |
| 2004/0013092 A1 | 1/2004 | Betker et al. |
| 2004/0013125 A1 | 1/2004 | Betker et al. |
| 2004/0015638 A1 | 1/2004 | Bryn |
| 2004/0024831 A1 | 2/2004 | Yang et al. |
| 2004/0028038 A1 | 2/2004 | Anderson et al. |
| 2004/0057389 A1 | 3/2004 | Klotz et al. |
| 2004/0081186 A1 | 4/2004 | Warren et al. |
| 2004/0081394 A1* | 4/2004 | Biran et al. .................. 385/31 |
| 2004/0085955 A1 | 5/2004 | Walter et al. |
| 2004/0100944 A1 | 5/2004 | Richmond et al. |
| 2004/0109418 A1 | 6/2004 | Fedorkow et al. |
| 2004/0123181 A1 | 6/2004 | Moon et al. |
| 2004/0141521 A1 | 7/2004 | George ....................... 370/463 |
| 2004/0153914 A1 | 8/2004 | El-Batal |
| 2004/0174813 A1 | 9/2004 | Kasper et al. |
| 2004/0208201 A1 | 10/2004 | Otake |
| 2004/0267982 A1 | 12/2004 | Jackson et al. |
| 2005/0023656 A1 | 2/2005 | Leedy |
| 2005/0036499 A1 | 2/2005 | Dutt et al. |
| 2005/0058148 A1 | 3/2005 | Castellano et al. |
| 2005/0117522 A1 | 6/2005 | Basavaiah et al. |
| 2005/0141661 A1 | 6/2005 | Renaud et al. |
| 2005/0177641 A1 | 8/2005 | Yamagami |
| 2006/0047852 A1 | 3/2006 | Shah et al. |
| 2006/0074927 A1 | 4/2006 | Sullivan et al. |
| 2006/0156083 A1 | 7/2006 | Jang et al. |
| 2006/0184711 A1 | 8/2006 | Pettey |
| 2007/0124623 A1 | 5/2007 | Tseng |

FOREIGN PATENT DOCUMENTS

| | | |
|---|---|---|
| EP | 0738978 | 10/1996 |
| EP | 0856969 | 1/1998 |
| EP | 1059588 | 12/2000 |
| WO | WO-95/06286 | 3/1995 |
| WO | WO-98/36537 | 8/1998 |
| WO | WO-0058843 | 10/2000 |
| WO | WO03/088050 | 10/2003 |

OTHER PUBLICATIONS

Malavalli, Kumar, et al., "Distributed Computing with fibre channel fabric", Proc of the Computer Soc. Int'l Conf., Los Alamitos, IEEE Comp Soc. Press., vol. Conf. 37, XP000340745, (Feb. 24, 1992), pp. 269-274.

Martin, Charles R., "Fabric Interconnection of fibre channel standard nodes", Proceedings of the SPIE, (Sep. 8, 1992), pp. 65-71.

Yoshida, Hu, "LUN Security Considerations for Storage Area Networks," Hitachi Data Systems Paper—XP 002185193 (1999), pp. 1-7.

Claudio DeSanti, "Virtual Fabrics Switch Support" ; VF Switch Support, T11/04-395v2. Sep. 2004, pp. 1-15.

Pelissier et al, "Inter-Fabric Routing", dated Jul. 30, 2004, Inter Fabric Routing (04-520v0); pp. 1-31.

DeSanti et al, "Virtual Fabrics"; Virtual Fabrics, T11/03-352v0, May 2003; pp. 1-4.

Martin et al , "Virtual Channel Architecture", Presentation by Brocade to T11/03-369V0 dated Jun. 2, 2003.

Curtis, A. R., "Design Considerations for 10-Gbit Fibre Channel", *Curtis A. Ridgeway, Distinguished I/O Architect, Storage and Computing ASIC's Division, LSI Logic Corp.*

Malavalli, Kumar, "High Speed Fibre Channel Switching Fabric Devices", *Proceedings of the SPIE*, SPIE, Bellingham, VA, USA vol. 1577,, XP000562869, ISSN: 0277-786X,(Sep. 4, 1991),216-226.

Melhem, et al., "Minimizing Wavelength Conversions in WDM Path Establishment", *Computer Science Department, University of Pittsburgh*, Pittsburgh, PA 15260, (2001), 197-211.

Ridgeway, Curt , "0GFC-40GFC using 4-lane XAUI's", *LSI Logic Presentation—T11/03-069v0.*

Brown, Douglas W., "A State-Machine Synthesizer", *18th Design Automation Conference*, (1981),301-305.

Banks, David C., et al., "Link Trunking and Measuring Link Latency in Fibre Channel Fabric", U.S. Appl. No. 60/286,046, 1-52.

Naik, D. "Inside Windows Storage:Server Storage Technologies for Windows 2000, Windows Server 2003 and Beyond", *Addison-Wesley, US, Chapter 5, XP-002381152*, (Jul. 15, 2003), 137-173.

"Deliver Server-Free Backup", *Pathlight & Computer Associates*, White Paper of Apr. 2000, Ithaca, New York, XP-002381153, 1-8.

Budruk, Ravi et al., "PCI Express System Architecture", (2004),434,436-439,442-443.

"PCI Express Base Specification Revision 1.0", (Apr. 29, 2002), 195-196.

International Preliminary Report on Patentability dated Apr. 3, 2007, for International patent application No. PCT/US2005/034844.
International Preliminary Report on Patentability dated Apr. 3, 2007, for International patent application No. PCT/US2005/034758.
International Preliminary Report on Patentability dated Apr. 11, 2007, for International patent application No. PCT/US2005/034845.
International Preliminary Report on Patentability dated Apr. 3, 2007, for International patent application No. PCT/US2005/035064.

International Preliminary Report on Patentability dated Jul. 24, 2007, for International patent application No. PCT/US2005/42528.

"Examination Report from the European Patent Office dated Oct. 12, 2007 for European Application No. 05 805 632.6".

* cited by examiner

METHOD AND SYSTEM FOR CONTROLLING PACKET FLOW IN NETWORKS

BACKGROUND

1. Field of the Invention

The present invention relates to networks, and more particularly to routing network packets in switches.

2. Background of the Invention

Switches are commonly used in networks. A typical switch routes network packets (may also be referred to herein as "packets") from one port to another port. Various industry standards and protocols are used to monitor and manage data packet transmission through networks and switches. One such standard is Infiniband published by the Infiniband Trade Association and incorporated herein by reference in its entirety. Infiniband provides an architecture that allows a single unified input/output (I/O) fabric. The standard provides a virtual lane (VL) mechanism that allows network data packets from different sources and bound for different destinations, to flow through a single channel. The standard also describes how data packets are processed for delivery within each virtual lane.

Switches in networks typically use a central arbitration unit that selects input/out ports for initiating packet transfer. Various algorithms are used by arbitration units for selecting (or not selecting) a particular port for packet transfer.

Typically, arbitration units arbitrate port "requests" without any knowledge of remote port buffer space and size where the packets are stored after delivery. Hence, in conventional switches, the arbitration unit transfers data packets without knowing how much remote buffer space is available for storing the transferred packet(s). This can result in packet dropping, port stalling and remote buffer overrun.

In addition, most arbitration units select packets for transmission based on a first in-first out (FIFO) model. This is inefficient if packets are received from the same source and are meant for the same destination using the same virtual lane. In this case, the FIFO model is inefficient because packets with the foregoing conditions should be sent in close proximity to each other rather than waiting to satisfy the FIFO requirements.

Another drawback in conventional switch fabrics is that packets are accumulated, bundled and then transmitted. This increases latency based on the number of packets.

Therefore, what is needed is a process and system, such that switches can efficiently transmit packets and also arbitrate and select packets for transmission with minimum packet dropping, port stalling and remote buffer overrun.

SUMMARY OF THE INVENTION

In one aspect of the present invention, a method for transmitting network packets is provided. The method includes, determining a network packet size; determining a remote buffer space size at a destination port where the network packet is to be sent; determining if the remote buffer space size is sufficient to hold the network packet; and then transmitting the network packet to the destination port. If there is not enough remote buffer space to hold the network packet, it may be discarded.

In another aspect of the present invention, a system for transmitting network packets is provided. The system includes a receiving port that receives the network packet and generates a packet descriptor and packet size descriptor; a transmit port that receives packet tags with packet descriptor and packet size information; and an arbitration module that receives remote buffer space size information and transmits the network packet if the remote buffer space has enough space to hold the packet.

The system also includes an arbitration priority table that provides priority information regarding virtual lane access in the transmit port to the arbitration module; and a first in first out (FIFO) storage at the transmit port for storing network packet tags.

In another aspect of the present invention, a system for bundling packets for network transmission is provided. The arbitration module determines if a second network packet is from a same source port having a same source virtual lane and will use the same destination virtual lane. If this is accurate, then the second network packet is transmitted after the first network packet, even if other network packets were received before the second network packet.

In another aspect of the present invention, a method for bundling network packets is provided. The method includes, determining if a second network packet has a same source of a first network packet; determining if the second network packet has a same source virtual lane as the first network packet; determining if the second network packet has a same destination virtual lane as the first network packet; and transmitting the second network packet after the first network packet even if other network packets received before the second network packet are waiting for transmission.

In one aspect of the present invention, while a first packet is currently being transmitted, the arbitration unit determines whether to bundle the second packet with the first. This "on-the-fly" packet bundling reduces latency.

In one aspect of the present invention, remote buffer space is efficiently used and is not overrun because only those packets that can fit the remote buffer space are transmitted. This also prevents port stalling and packet dropping.

In another aspect of the present invention, network packets are efficiently transmitted because they are bundled together based on certain conditions (e.g. same source, same source virtual lane and same destination virtual lane). This prevents packets to the same destination from waiting in the network queue and reduces latency.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

To facilitate an understanding of the preferred embodiment, the general architecture and operation of a network system will be described. The specific architecture and operation of the preferred embodiments will then be described with reference to the general architecture of the network system.

Figure 1A:
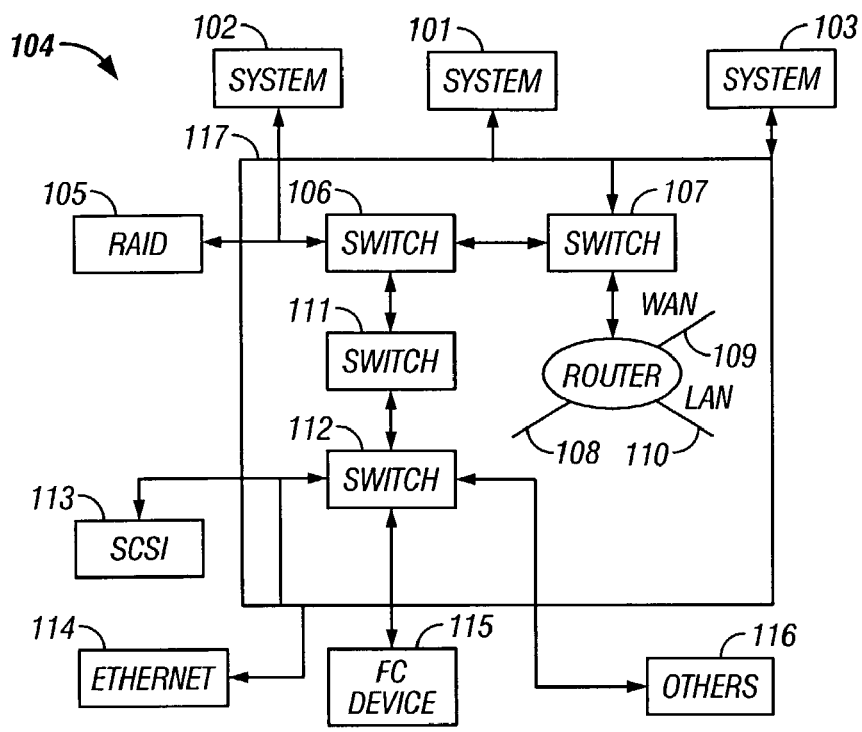
FIG. 1A shows a block diagram of a network using the INFINIBAND standard, according to one aspect of the present invention.

FIG. 1A shows a block diagram of plural computing devices operationally coupled using the Infiniband architecture as described in the Infiniband standard specification, published by the Infiniband Trade Association.

FIG. 1A shows system 104 with a fabric 117. Fabric 117 includes plural switches 106, 107, 111 and 112. Switches 106, 107, 111 and 112 may have common or separate functionality's, and can include the adaptive aspects of the present invention, described below. Fabric 117 also includes a router 108 that is coupled to a wide area network 109 and local area network 110.

Switch 106 is operationally coupled to a RAID storage system 105 and system 102, while system 101 and 103 may be operationally coupled to switch 107.

Switch 112 may be coupled to a small computer system interface ("SCSI") SCSI port 113 that is coupled to SCSI based devices. Switch 112 may also be coupled to Ethernet 114, fiber channel device (s) 115 and other device(s) 116.

It is noteworthy that systems 101-103 may be any computing system with a microprocessor that can be operationally coupled to a network, including one that is based on the Infiniband standard.

Figure 1B:
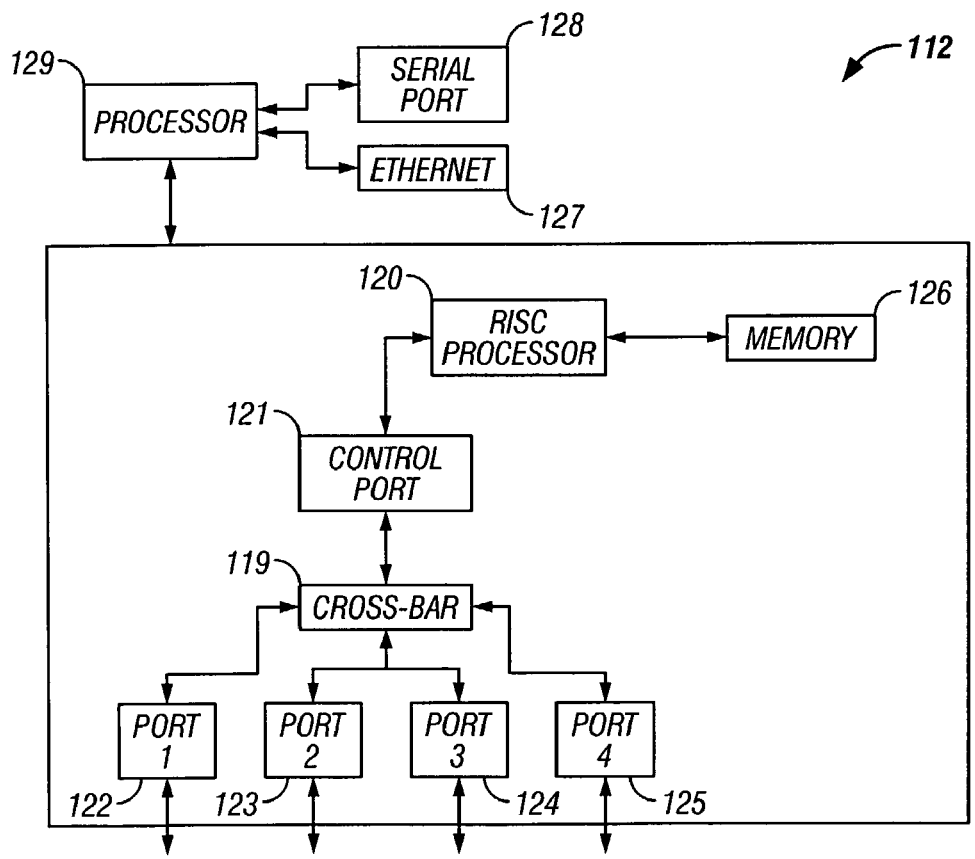
FIG. 1B shows a block diagram of a switch using the system, according to one aspect of the present invention.

FIG. 1B shows a block diagram of switch 112 that includes a processor 120 which is operationally coupled to plural ports 122, 123, 124 and 125 via a control port 121 and cross-bar 119. In one aspect of the present invention, processor 120 may be a reduced instruction set computer (RISC) type microprocessor. Ports 122-125 may be similar to ports 113-116, respectively.

Switch 112 may be coupled to a processor 129 that is coupled to Ethernet 127 and serial port 128. In one aspect of the present invention, processor 129 may be included in computing systems 101-103.

Figure 2A:
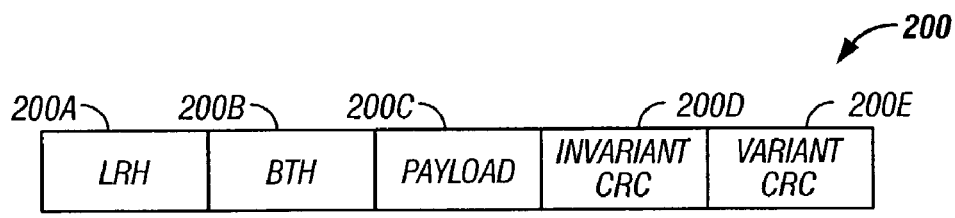
FIG. 2A shows a block diagram of a network packet structure used according to one aspect of the present invention.

FIG. 2A provides a example of packet structure that may be used in the various adaptive aspects of the present invention. It is noteworthy that this is to illustrate the adaptive aspects of the present invention. Other packet structures may be used with the methods and systems described below.

Packet 200 includes a local route header 200A, a base transport header (BTH) 200B, packet payload 200C, invariant cyclic redundancy code (CRC), and variant CRC 200E. Packet structure 200 is also described in Infiniband Architecture Specification, Volume 1, Chapter 6, titled "Data Packet Format", incorporated herein by reference in its entirety.

Figure 2B:
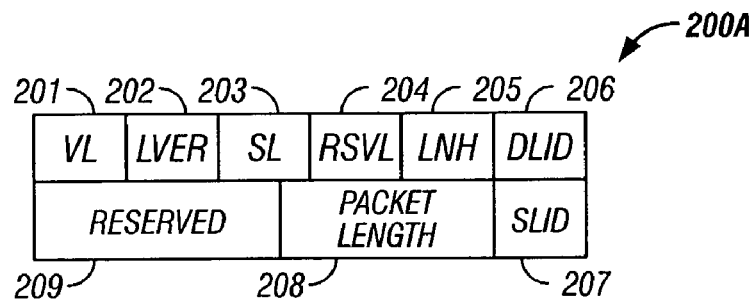
FIG. 2B shows a block diagram of a local route header in the packet structure of FIG. 2A, used according to one aspect of the present invention.

FIG. 2B shows a block diagram of local route header (LRH) 200A, where the local route contains the fields for local routing by switches within an InfiniBand subnet (LRH in InfiniBand (Subnet routing) is analogous to FC-2 in Fibre Channel and MAC layer (LAN routing) in Ethernet. In all three cases it is considered Layer 2 routing/switching information). LRH 200A includes a virtual lane (VL) field 201 that identifies which receive buffer and flow control credits should be used for processing a received packet, link version (Lver) field 202 specifies the version of the LRH packet 200A, service level (SL) field 203 is used by switch 112 to determine a transmit VL for a packet, and link next header (LNH) field 205 specifies what header follow the LRH 200A. Field 209 is a reserved field.

LRH 200A also includes a destination local identifier (DLID) field 206 that specifies the port to which switch 112 delivers the packet and source identifier (SLID) field 207 that indicates the source of the packet. Packet length field 208 specifies the number of words contained in a packet.

Figure 3:
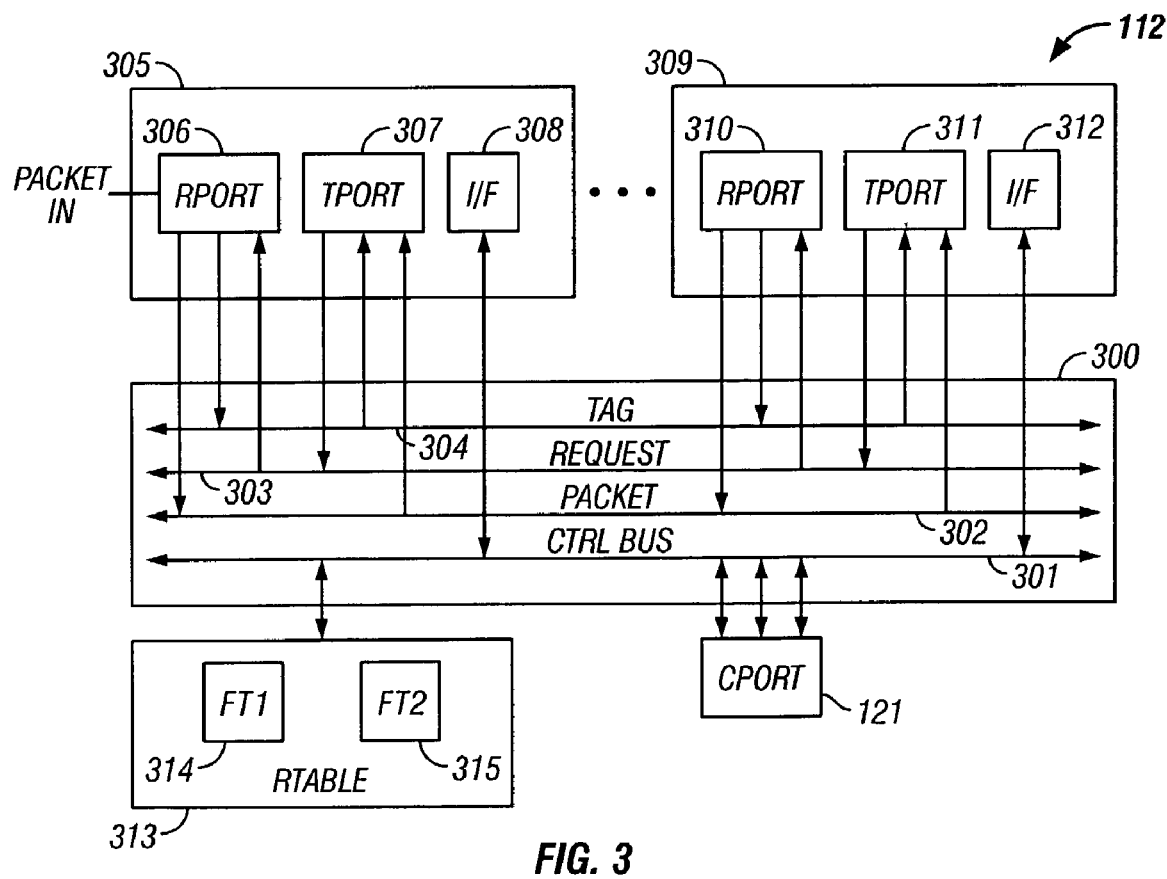
FIG. 3 shows another block diagram of a switch with a switch fabric, according to one aspect of the present invention.

FIG. 3 shows a block diagram of switch 112 with a switch fabric 300 and associated components. Switch fabric 300 is operationally coupled to CPORT 121 and plural ports 305 and 309. It is noteworthy that ports 305 and 309 are similar to ports 122-125.

Switch fabric 300 includes a packet data crossbar 302, packet request crossbar 303 and packet tag crossbar 304 and a control bus 301.

Packet data crossbar 302 connects receive ports (306, 310), transmit ports (307, 311), and can concurrently transmit plural packets via plural VLs.

Packet Tag crossbar 303 is used to move plural packet tags from receive ports (306, 310) to transmit ports (307, 311), as described below.

Packet request crossbar 303 is used by transmit port (307, 311) to request a particular packet from a receive buffer.

Routing table (RTABLE) 313 is used to map DLID from a LRH 200A to one or more output ports. A forwarding table 314 includes look up tables (LUTs) that service ports 305 and 309. Ports 305 and 309 (also referred to as XPORT) are a part of switch 112.

Interface (I/F) 308 and 312 provide input/output interface to switch 112.

Figures 4A, 4B:
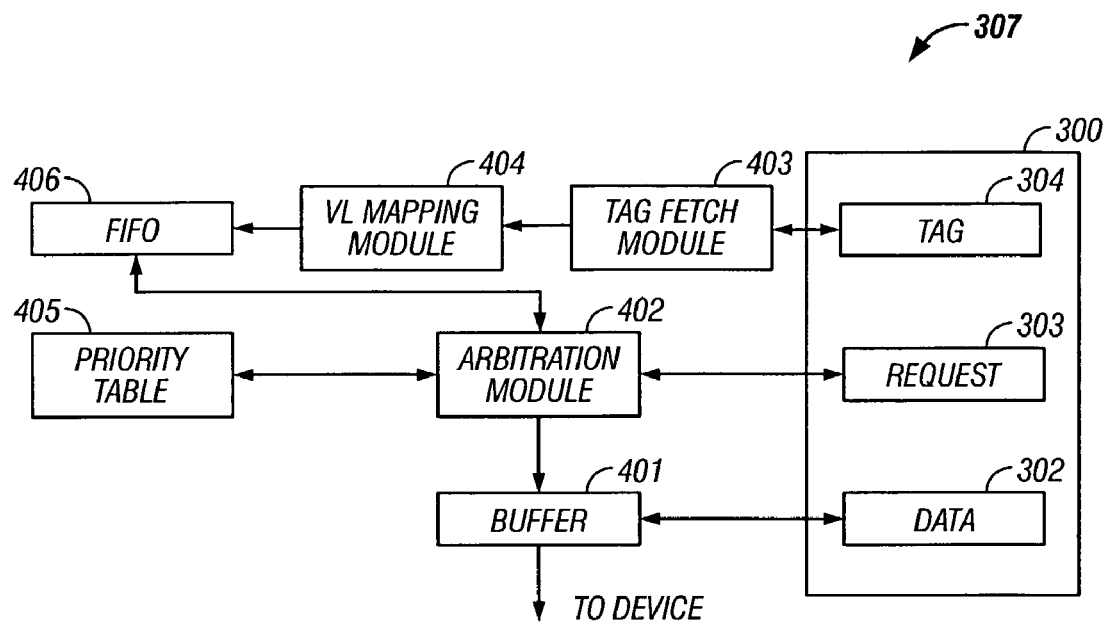
FIG. 4A shows a block diagram of a transmit port, according to one aspect of the present invention.
FIG. 4B is a block diagram of a virtual lane priority table, according to one aspect of the present invention.

FIG. 4A shows a block diagram of transmit port 307 in switch 112 with an arbitration module 402. It is noteworthy that each transmit port (e.g. 307, 311) may have its own arbitration module (also referred to as "arbitration unit") for transmitting packets.

Incoming packets are received by receive ports (306, 310). Incoming packets include the size of the data packet. This information may be included in the packet header 200. Packets are stored in receive port 305 buffer(s) (not shown).

Transmit tag fetch module 403 receives packet tags using packet tag crossbar 304. The tags are sent to a VL mapping module 404 which is used to map packet service level (SL) to a given output VL. This allows packets to enter via one VL and leave via another VL. Tags that are mapped by VL mapping module 404 are stored in a tag FIFO 406. Each packet tag represents data packets residing at receive port 306 buffer (not shown) waiting to be fetched. The tags include information on packet size, receive port (e.g. 306, 310) and receive port VL. Arbitration module 402 selects a packet tag from one of the VL tag FIFOs. The tag is used to generate a packet request and results in subsequent packet transfer.

Arbitration module 402 selects a packet from a set of candidate packets available for transmission from a port. As mentioned earlier, each port has its own arbitration module. VL priority table 405 provides packet ordering priority, which may be as shown below in Table I:

| PACKET TYPE | PRECEDENCE ORDER |
|---|---|
| MANAGEMENT PACKET | HIGHEST |
| LINK PACKET | $2^{ND}$ HIGHEST |
| DROP PACKET | $3^{RD}$ HIGHEST |
| OTHERS | LOWEST |

Packets at a higher precedence level are sent before packets at a lower precedence level.

A block diagram of VL arbitration priority table 405 is shown in FIG. 4B. VL arbitration priority table 405 includes three components, High Priority 405A, Low Priority 405D and Limit of High Priority 405G.

High Priority 405A and Low priority 405D includes plural entries with a VL number (for example, 405B and 405E, respectively) and a weightage value (for example, 405C and 405F). The weightage values indicate the number of byte units during which packet transmission may occur from a VL. The unit includes a header, payload, CRC and packet padding.

Limit of High priority value 405G indicates the number of high priority packets that can be transmitted without sending a low priority packet. VL arbitration values may be adjusted dynamically, as discussed below, while a port is active.

Priority values 405A and Low Priority values 405D form a two level priority scheme. If there is a packet available for transmission from any VL listed as a high priority component, then it is transmitted first. Transmission of packets with low priority values 405D occurs when:

No packets with high priority values 405A are available; or

The high priority transmit period has been exceeded defined by the Limit of High Priority value 405G.

Weighted round robin arbitration is used within each high or low priority component, where the order of entries for each component specifies the order of VL scheduling and the weightage value specifies the bandwidth allocated to the specific entry.

When an entry is completed, arbitration module 402 proceeds to the next value. The available weight is then set for the new entry. A packet is sent to an output port for transmission (via Buffer 401) and the available weight value is decreased for a current entry. This allows a transmit port (e.g., 307, 311) to send packets that are from the same source with the same destination efficiently without delay or port stalling.

In another aspect of the present invention, arbitration module 402 is provided with information regarding the remote buffer (or memory) where a packet is being sent. The remote buffer space size information together with the packet size informs arbitration module 402 whether the remote buffer can receive a packet. If a remote buffer cannot accommodate a given packet, the next VL (as shown by 405B, FIG. 4B)/WT (as shown by 405F, FIG. 4B)) pair is tested against the available packet candidates. This process continues until either a packet is selected and transmitted, or the port stalls. If the port stalls, it is an indication that the remote device does not have enough buffer space for any packet. This prevents packet dropping and port stalling.

Figure 5:
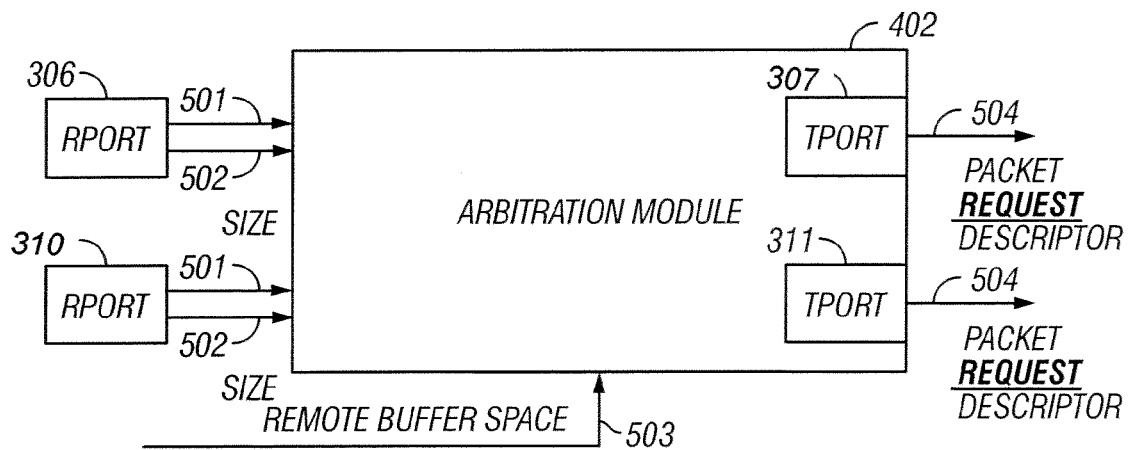
FIG. 5 shows a block diagram showing an arbitration module, according to one aspect of the present invention.

FIG. 5 shows another top-level block diagram of switch 112 with arbitration unit 402. Receive port 306 receives packets from a device (not shown) and a packet request descriptor 501 with the packet size descriptor 502 are sent to arbitration module 402. Remote buffer space 503 information is also provided to arbitration module 402 in real time.

Arbitration module 402 uses remote buffer space 503 information with packet size data 502 to generate packet request (to a receive port (e.g. 306) to fetch a packet) descriptor 504 such that remote buffer space 503 is not overrun or under utilized. Arbitration module 402 uses this information with the priority table 405 and VL mapping module 404 information that is stored in FIFO 406, as described above.

Figure 6:
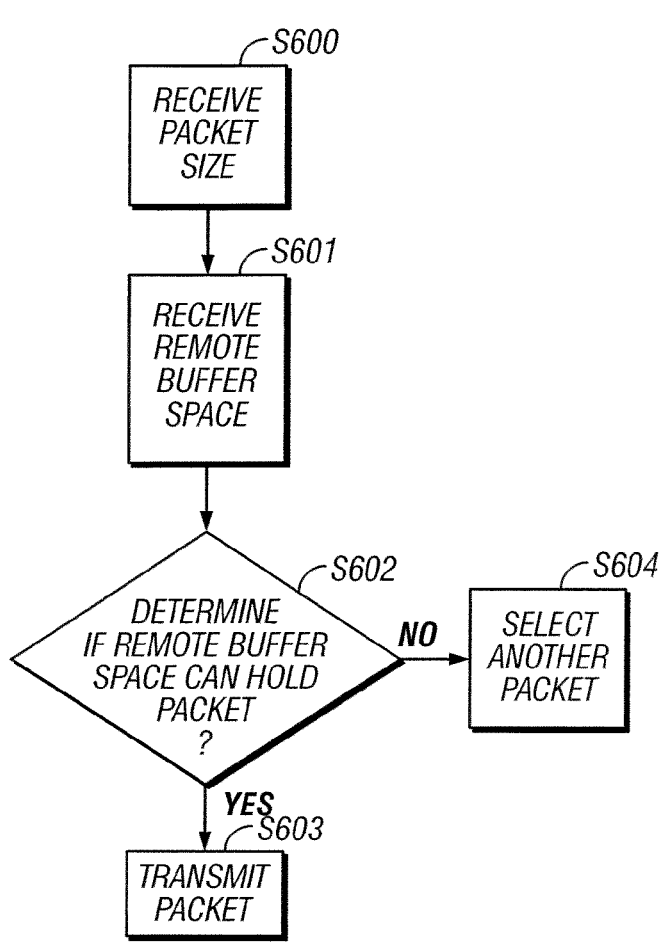
FIG. 6 shows a flow diagram for transmitting network packets to avoid remote buffer overrun, according to one aspect of the present invention.

FIG. 6 shows a flow diagram for transmitting packets based on remote buffer space availability.

In step S600, arbitration module 402 receives packet size and descriptor information. This also provides arbitration module 402 with the location of the remote buffer.

In step S601, arbitration module 402 obtains information (503) regarding the remote buffer space (via link layer or layer 1 VL flow control packets (not shown)). Such information will include the amount of buffer space available at any given time. This information allows arbitration module 402 to send packets that can be held in the remote buffer space.

In step S602, arbitration module 402 determines if the remote buffer can hold the packets based on packet size and available buffer space at a given time.

In step S603, arbitration module 402 sends the packets if the packet can fit in the available remote buffer space.

If the remote buffer cannot hold the packet, then in step S604, arbitration module 402 selects another packet for transmission. Steps S600 to S603 are repeated until the packet selected will fit in the remote buffer.

In one aspect of the present invention, packets that are from the same source port and received in consecutive order, have the same source VL and the same destination VL ("bundling conditions") are bundled together. Arbitration module 402 sends these packets sequentially. Arbitration module 402 while sending a packet, searches for packets that meet the bundling conditions. The incoming packet is moved ahead of the transmit queue if the incoming packet meets the bundling conditions. This allows switch 112 to efficiently transmit packets if the bundling conditions are met.

Figure 7:
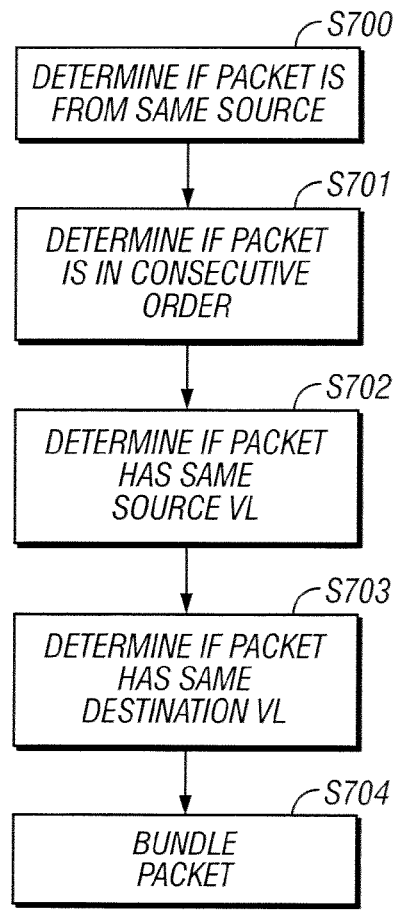
FIG. 7 shows a flow diagram for bundling network packets, according to one aspect of the present invention.

FIG. 7 shows a process flow diagram for "packet bundling" such that packets from the same source and destination are sent in order.

In step S700, based on the packet tag information (or descriptor 501) arbitration module 402 determines if the packet is from the same source as a previous packet that has been transmitted.

If the packet is from the same source, then in step S701, arbitration module 402 determines if the packet received is in a consecutive order with respect to the previous packet received from the same source. If the packet is in consecutive order, then in step S703, arbitration module 402 determines if the packet has the same destination VL.

If the packet has the same destination VL, then it is sent after the previously transmitted packet, instead of waiting in a FIFO based system. Hence, the incoming packet is transmitted using a Last In-First Out (LIFO) system, instead of the first in first out (FIFO). This allows the packets to be efficiently transmitted.

In one aspect of the present invention, while a first packet is currently being transmitted, the arbitration unit determines whether to bundle the second packet with the first. This "on-the-fly" packet bundling reduces latency.

In one aspect of the present invention, remote buffer space is efficiently used and is not overrun because only those packets that can fit the remote buffer space are transmitted. This also prevents port stalling and packet dropping.

In another aspect of the present invention, network packets are efficiently transmitted because they are bundled together based on certain conditions (e.g. same source, same source virtual lane and same destination virtual lane). This prevents packets to the same destination from waiting in the network queue and reduces latency.

Although the present invention has been described with reference to specific embodiments, these embodiments are illustrative only and not limiting. Many other applications and embodiments of the present invention will be apparent in light of this disclosure and the following claims.

What is claimed is:

1. A method for transmitting a plurality of network packets, comprising:
   (a) receiving network packet information for transmitting a network packet from one of the plurality of network packets that are waiting to be transmitted at a given time; wherein an arbitration module of a network switch receives the network packet information that includes information regarding network packet size;
   (b) obtaining information regarding a remote buffer at a destination port where the network packet is to be sent; wherein the arbitration module obtains the information regarding the remote buffer;
   (c) determining if available space in the remote buffer is sufficient to hold the network packet; and
   (d) transmitting the network packet via a virtual lane to the destination port, if the network packet can be stored in available space in the remote buffer.

2. The method of claim 1, further comprising:
selecting another network packet from the plurality of network packets and repeating steps (a) to (d), if available space in the remote buffer is not enough to hold the network packet.

3. The method of claim 1, wherein the network switch is an Infiniband switch.

4. The method of claim 1, wherein a network packet tag includes information regarding network packet size and information regarding a receive port where the network packet is waiting to be fetched for transmission and the arbitration module uses the network tag information and generates a packet request to transmit the network packet.

5. The method of claim 1, wherein the arbitration module selects a network packet from among the plurality of network packets based on a priority table that stores information to categorize a network packet as a high priority network packet or a low priority packet; and the priority table stores a value for limiting transmission of high priority network packets before transmitting a low priority network packet that is waiting for transmission at any given time.

6. The method of claim 5, wherein a low priority network packet is transmitted if there is no high priority network packet waiting for transmission; or if a period to transmit a high priority network packet has exceeded the value in the priority table to limit transmission of high priority network packets.

7. The method of claim 5, wherein the arbitration module transmits a second network packet after a first network packet even if other network packets that were received before the second network packet are waiting for transmission, if the second network packet is received from a same source as the first network packet; the second network packet is destined for a same destination as the first network packet and the second network packet is received in a consecutive order after the first network packet.

8. A system for transmitting a plurality of network packets, comprising:
   a receive port of a network port in a network switch that receives a network packet and generates a packet descriptor and packet size information;
   a transmit port of the network port of the network switch that receives a packet tag with the packet descriptor and packet size information; and
   an arbitration module that selects a network packet from among the plurality of network packets that are waiting to be transmitted at a given time, obtains information regarding available space in a remote buffer and compares the packet size information with the available space in the remote buffer and transmits the network packet via a virtual lane if the available space in the remote buffer is large enough to hold the network packet.

9. The system of claim 8, wherein the network port stores an arbitration priority table that stores information to categorize a network packet as a high priority network packet or a low priority packet; and the priority table stores a value for limiting transmission of high priority network packets before transmitting a low priority network packet that is waiting for transmission at any given time via a virtual lane.

10. The system of claim 9, wherein a low priority network packet is transmitted via a virtual lane if there is no high priority network packet waiting for transmission; or if a high priority transmit period has exceeded the value in the priority table that limits transmission of high priority network packets.

11. The system of claim 3, wherein the network switch is an Infiniband switch.

12. The system of claim 8, wherein the arbitration module transmits a second network packet after a first network packet even if other network packets that were received before the second network packets are waiting for transmission, if the second network packet is received from a same source as the first network packet; the second network packet is destined for a same destination as the first network packet and the second network packet is received in a consecutive order after the first network packet.

13. A system for network transmission, comprising:
   a first network switch communicating with a second network switch; wherein the first network switch comprises a receive port of a network port in the first network switch that receives a network packet and generates a packet descriptor and packet size information; a transmit port of the network port of the first network switch that receives a packet tag with the packet descriptor and packet size information; and
   an arbitration module for the network port of the first network switch that determines if a second network packet is from a same source port having a same source virtual lane and destination virtual lane and was received in a consecutive order, and transmits the second network packet after the first network packet, even if other packets were received before the second network packet and are waiting to be sent, wherein the network port for the first network switch stores an arbitration priority table that stores information to categorize a network packet as a high priority network packet or a low priority packet; and the priority table stores a value for limiting transmission of high priority network packets before transmitting a low priority network packet that is waiting for transmission at any given time.

14. The system of claim 13, wherein a low priority network packet is transmitted if there is no high priority network packet waiting for transmission; or if a high priority transmit period has exceeded the value in the priority table that limits transmission of high priority network packets.

15. The system of claim 13, wherein the network switch is an Infiniband switch.

* * * * *